April 16, 1935.    R. LAPSLEY    1,997,827
HYDRAULIC TRANSMISSION
Filed May 12, 1933    7 Sheets-Sheet 1

Inventor:
Robert Lapsley
By Brown, Jackson, Boettcher & Dienner
Attys

Inventor:
Robert Lapsley
By Brown, Jackson
Boettcher + Dienner
Att'ys.

April 16, 1935.  R. LAPSLEY  1,997,827

HYDRAULIC TRANSMISSION

Filed May 12, 1933  7 Sheets-Sheet 4

Inventor
Robert Lapsley
By Brown, Jackson, Boettcher & Dienner
Att'ys.

April 16, 1935.  R. LAPSLEY  1,997,827
HYDRAULIC TRANSMISSION
Filed May 12, 1933  7 Sheets-Sheet 5

Inventor:
Robert Lapsley
By Brown, Jackson, Boettcher & Dienner
Att'ys.

April 16, 1935.  R. LAPSLEY  1,997,827
HYDRAULIC TRANSMISSION
Filed May 12, 1933   7 Sheets-Sheet 7

Inventor:
Robert Lapsley
By Brown, Jackson, Boettcher & Dienner
Attys.

Patented Apr. 16, 1935

1,997,827

UNITED STATES PATENT OFFICE 1,997,827

HYDRAULIC TRANSMISSION

Robert Lapsley, Berrien Springs, Mich., assignor to Clark Equipment Company, Buchanan, Mich., a corporation of Michigan Application May 12, 1933, Serial No. 670,705

5 Claims. (Cl. 60—53)

The present invention relates generally to apparatus for transmitting torque or power by hydraulic means capable of adjustment to secure different driving ratios. Briefly, it is the principal purpose of the present invention to provide an improved hydraulic transmission for automotive vehicles and the like. More specifically, one purpose of the present invention is to provide a hydraulic transmission in which the driving and driven units are substantially identical and are controlled by a servo-motor mechanism deriving energy from the power developed by the driving unit.

Another object of the present invention is the provision of a constantly variable hydraulic reduction drive with a non-hydraulic direct drive and a predetermined maximum speed reducing ratio between the driving and driven units.

A further object of the present invention is the provision of a hydraulic transmission in which the low speed ratio is limited to a reduction which does not cause the development of excessive unit pressures within the driving unit. In this connection, it is also the purpose of the present invention to provide improved control means for securing the desired reduction.

Still further, another object of the present invention is the provision of interrelated mechanical clutch means for mechanically connecting the driving and driven units of the transmission together for rotation at a one to one ratio and, at the same time, adjusting the hydraulic units, preferably simultaneously therewith, so that the development of driving pressures is interrupted when the mechanical connection is established.

An additional object of the present invention is the provision of a hydraulic driving unit which is of the variable eccentric type and in which the reactions imposed upon the variable eccentric mechanism are adequately taken care of in accordance with the pressures developed by the driving unit. In this connection, it is also the purpose of the present invention to provide adjusting means for the variable eccentric mechanism so constructed and arranged that the driving unit may be driven either forwardly or backwardly according to the adjustment or position of the eccentric means.

Another object of the present invention is the provision of a hydraulic motor deriving its energy from a driving pressure unit and also provided with variable eccentric mechanism for adjusting the motor. The present invention contemplates accomplishing this adjustment by the pressures developed within or by the driving hydraulic unit.

These and other objects and advantages of the present invention will be apparent to those skilled in the art after a consideration of the following detailed description of an illustrative construction embodying the principles of my invention, taken in conjunction with the accompanying drawings illustrating such embodiment.

Referring now to the drawings, the housing for the transmission is indicated by the reference numeral 10 and comprises two sections 11 and 12 having connecting flanges 13 and 14 which are adapted to be secured together in any desired manner. Between the flanges 13 and 14 an intermediate wall or web 15 is secured, and this wall is arranged to support certain of the stationary parts of the transmission, as will be later described in detail.

Journaled for rotation in the housing or casing 10 is a driving shaft 20 and a driven shaft 21, the latter being piloted at its forward end 23 within a socket 24 formed in the rear end of the driving shaft 20, the forward end 23 being reduced and supported by bearing means 25 within the socket 24. The forward end of the driving shaft 20 is supported by suitable bearing means and is adapted to be connected with any suitable source of power. The forward end of the driven shaft 21 is splined, as indicated by the reference numeral 28, to receive an axially shiftable clutch member 30 having clutch teeth 31 formed to engage cooperating clutch teeth 32 formed on or carried by the rear end of the driving shaft 20. A grooved collar 35 provides for shifting the clutch member 30 into and out of engagement with the teeth 32. The means for shifting the clutch 30 and the manner of the control thereof will be referred to later in detail, but it will be noted that when the clutch member 30 engages the teeth 32 the driving shaft 20 and driven shaft 21 are positively and mechanically connected to rotate together. In automotive practice this is known as a direct drive.

The rear end of the driving shaft 20 adjacent the clutch portion 32 is provided with bearing means 38 by which this end of the driving shaft is supported on the intermediate web or wall 15. The rear end of the driven shaft 21 is rotatably supported by bearing means 40 disposed in a bearing hub 41 formed on the rear wall 42 of the rear casing section 12. The rear end of the driven shaft 21 is tapered, as indicated at 43, to provide for the attachment of a propeller shaft or any other mechanism adapted to be driven by the hydraulic transmission of the present invention.

The hydraulic mechanism operatively disposed within the casing 10 comprises two units which are, for all practical purposes, substantially identical in construction and operation with the single exception that one is a normally driving unit deriving power from a motor or the like while the other is a driven unit, the driving unit being associated with the driving shaft 20 while the driven unit is connected with the driven shaft 21. Either may, however, drive the other, and hence either may be the driving unit and either the driven unit.

The hydraulic driving unit is indicated in its entirety by the reference numeral 50 and comprises, briefly speaking, a series of rotatable cylinders, in each of which is disposed a movably mounted piston or the equivalent, and adjustable or shiftable eccentric means operatively connected with the pistons and rotatable with the cylinders to cause relative movement between the pistons and their cylinders. This movement of the pistons in their cylinders pumps liquid under pressure which is controlled by rotary valve means of the commutating type and which operatively directs the pumped liquid into the hydraulic driven unit. While the driving and driven units are structurally substantially identical, one normally forms the driving means and is hereinafter termed a hydraulic pump while the driven unit which receives the power from the driving unit is hereinafter termed the hydraulic motor. The cylinder casing, the pistons, and the eccentric means are substantially the same in both units, and in each of the hydraulic units the eccentric means is capable of adjustment to vary the displacement of that unit. As will be clear, to vary the displacement per revolution of either of the units is effective to vary the driving ratio established by the transmission.

Figure 1:
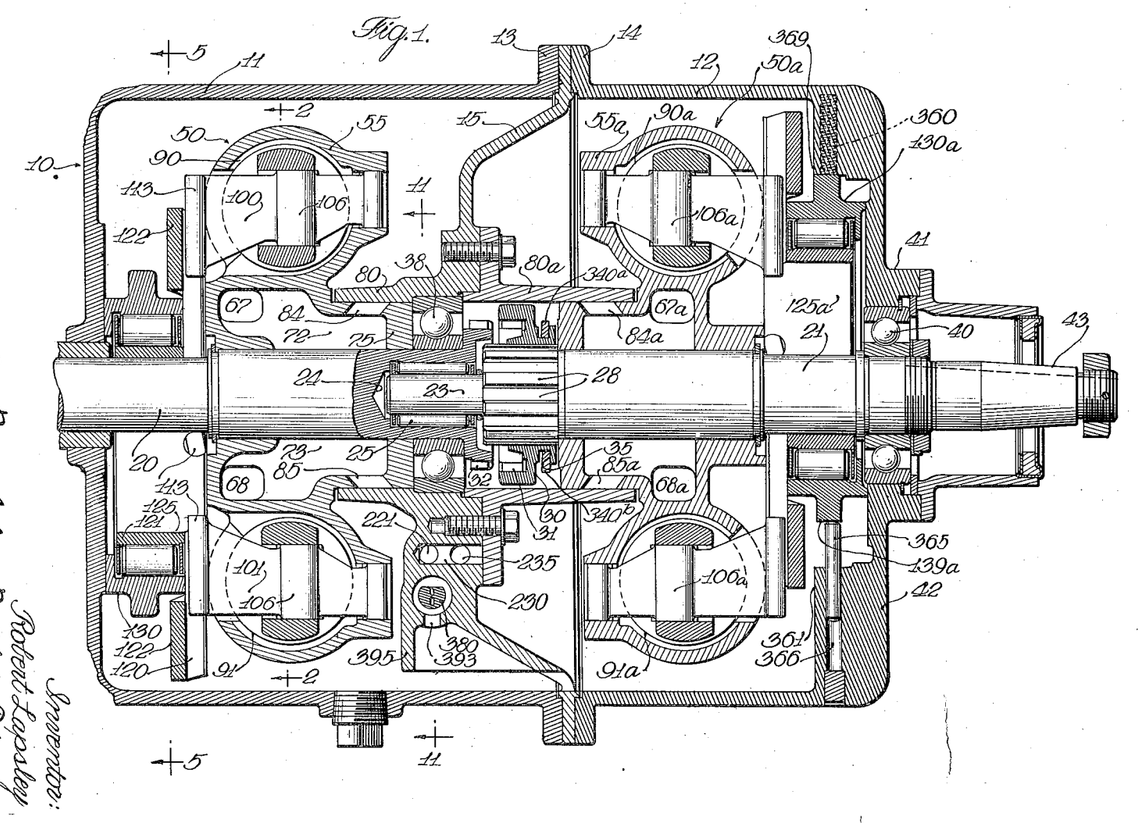
Figure 1 is a vertical cross section taken through a hydraulic transmission embodying the principles of the present invention.
Figures 2, 9, 10:
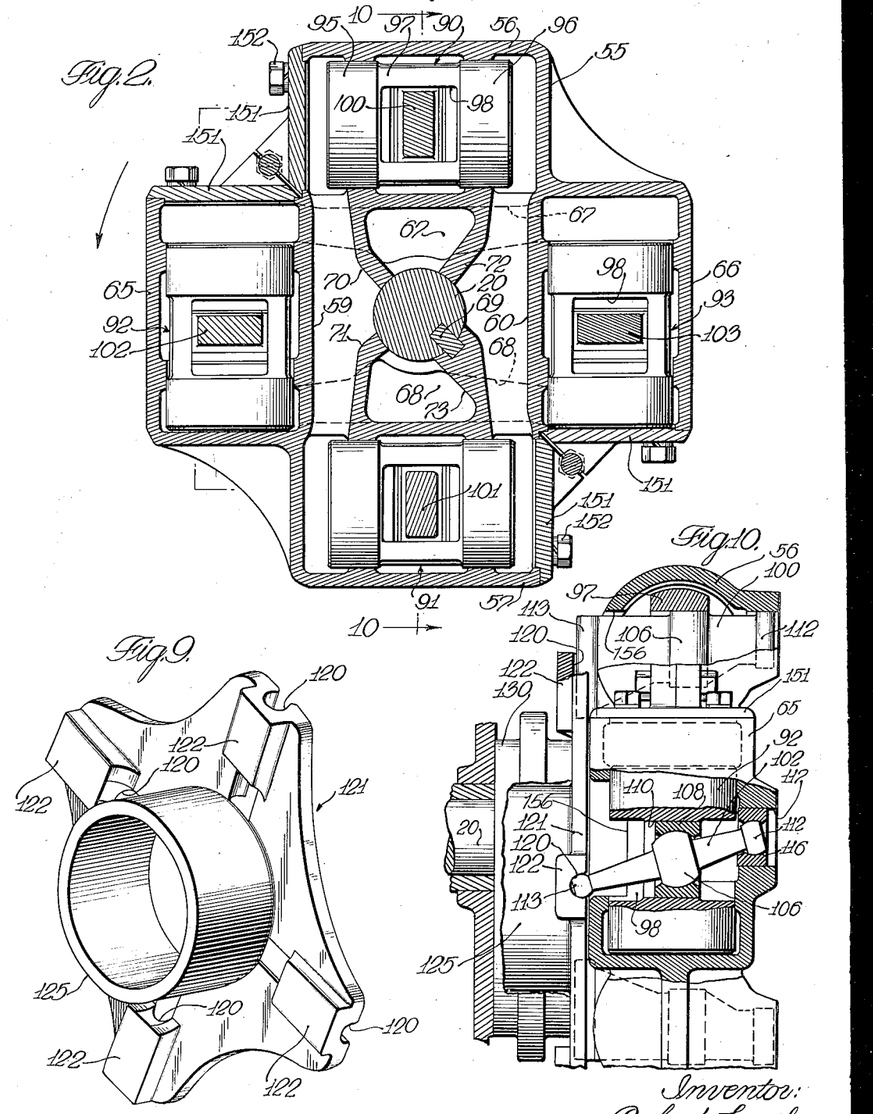
Figure 2 is a section taken along the line 2—2 of Figure 1.
Figure 9 is a perspective view of the rotatable piston control plate carried by the adjustable eccentric.
Figure 10 is a section taken along the line 10—10 of Figure 2 illustrating the levers or arms forming the connections between the piston control plate and the pistons.

Referring now more particularly to Figures 1 and 2, the cylinder casing of the driving unit or hydraulic pump 50 is indicated by the reference numeral 55 and comprises four cylinders arranged in tangential relation with respect to the axis of rotation of the driving shaft 20. The cylinders 56 and 57 form one pair and have their ends connected in communication with each other by ports or channels 59 and 60. The cylinders of the other pair of interconnected cylinders are indicated by the reference numerals 65 and 66 and the ends of these cylinders are connected together by means of ports or channels 67 and 68. The cylinder casing 55 is keyed or otherwise rigidly secured to the driving shaft 20 for rotation therewith by means of a suitable key 69.

Figures 3, 4:
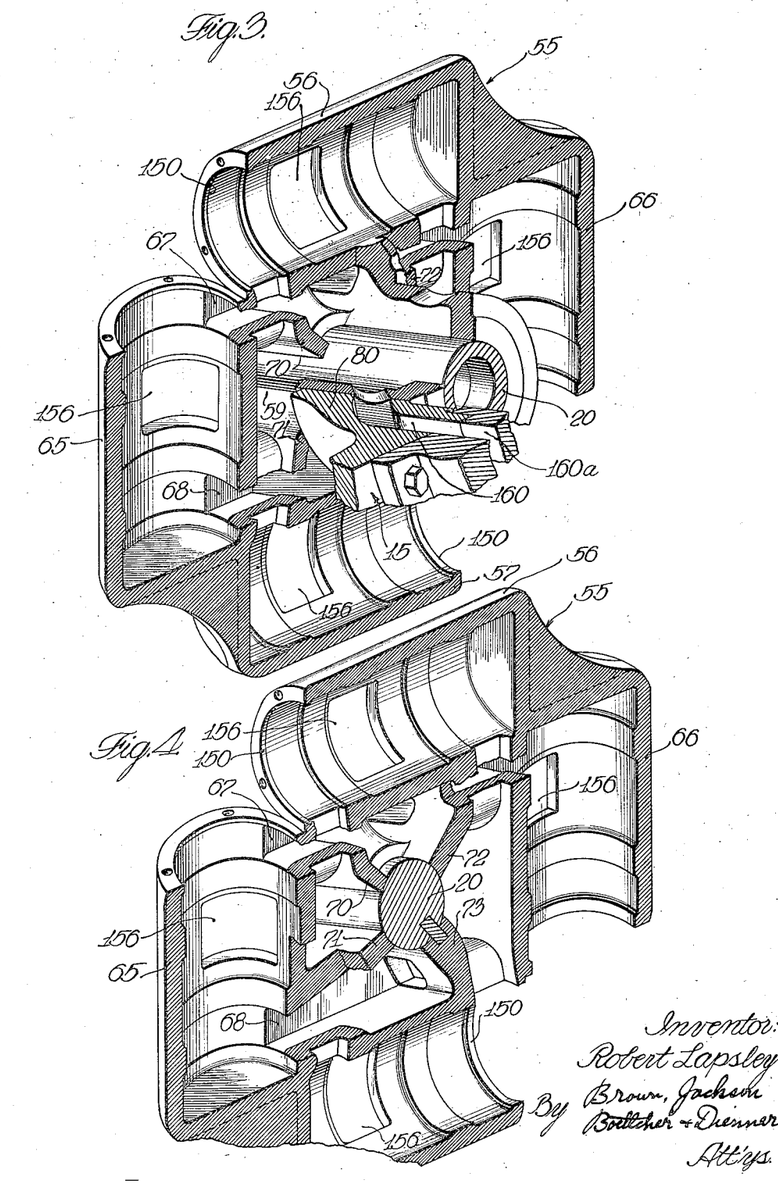
Figures 3 and 4 are perspective views of the cylinder casing of the hydraulic driving unit, the casing being cut away at different points, particularly to show the ports or channels connecting the pairs of cylinders and the manifold means affording communication between the driving and driven units.

Referring in particular to Figures 3 and 4 and to the pair of cylinders 56 and 57, one end of each of these cylinders communicates with the channel 59 while the other or opposite ends of these cylinders communicate with the port or channel 60. Likewise, the upper ends of cylinders 65 and 66 are in communication with each other through a channel 67 while the lower or opposite ends of these cylinders communicate with each other through a port or channel 68.

As will be clear from Figures 2, 3 and 4, the channels or passages 59 and 60 are separated from one another and from the other channels 67 and 68 by dividing walls 70, 71, 72, and 73, these walls being disposed substantially radially with respect to the driving shaft 20 and are extended axially thereof, as best shown in Figure 1, and terminate in an end wall 75 which closes off the extended portions of said channels. This extension of the cylinder casing 55 is provided with an outer cylindrical surface and is disposed within and in leak-tight relation with respect to a manifold section 80, see Figures 1 and 11, carried by and preferably formed integrally with the transverse wall 15 of the casing. From each of the channels 59 and 60, and 67 and 68, a port leads outwardly for directing fluid into or receiving fluid from the manifold 80. The ports are indicated, respectively, by the reference numerals 82, 83, 84 and 85.

Referring again to Figure 2, the pistons movably mounted within the cylinders 56, 57, 65, and 66 are indicated, respectively, by the reference numerals 90, 91, 92, and 93. Each of the pistons is double ended and formed with piston end portions 95 and 96 and an intermediate section 97 which is of reduced diameter and slotted, as at 98, to receive the associated piston controlling arm or lever.

The construction of the piston controlling arms is best shown in Figures 1, 2, and 10, and the arms associated with the pistons 90, 91, 92 and 93 are indicated respectively, by the reference numerals 100, 101, 102 and 103. As best shown in Figures 1 and 10, each of the piston controlling levers or arms is provided with a central cylindrical bearing portion 106 which is mounted for rocking movement in a complementarily formed slidable bearing member 108 shiftable laterally in a bearing portion 110 formed in the slot 98 of the piston. Each of the piston control arms is also provided with cylindrical ends 112 and 113. The end 112 is mounted for rocking movement in slidable bearing 116 mounted in a bearing portion 117 formed in one wall of the cylinder. The other cylindrical end 113 of the piston control arm or lever is disposed in a slot 120 formed in one portion of a rotatable control plate indicated in its entirety by the reference numeral 121 and best shown in Figure 9.

The slotted plate member 121 is provided with four slots 120, one for each of the piston control levers, and these slots are each formed in a boss portion 122 and are arranged substantially radially with respect to the axis of the plate member 121. The plate member is provided with a relatively large hub 125 by means of which the plate member is rotatably mounted in a shiftable eccentric 130 presently to be described in detail. As will be clear from Figure 10, any displacement of the plate member 121 with respect to the cylinders in any direction will occasion a rocking movement of these controlling levers which at the moment are swingable in that direction, and this will, in turn, cause the associated pistons to be moved within their cylinders. As just mentioned, eccentric means, or means adapted to be positioned eccentrically with respect to the driving shaft 20, are utilized in the present invention to cause relative movement between the rotatable eccentric plate member 121 and the cylinder casing 55.

Figures 5, 7:
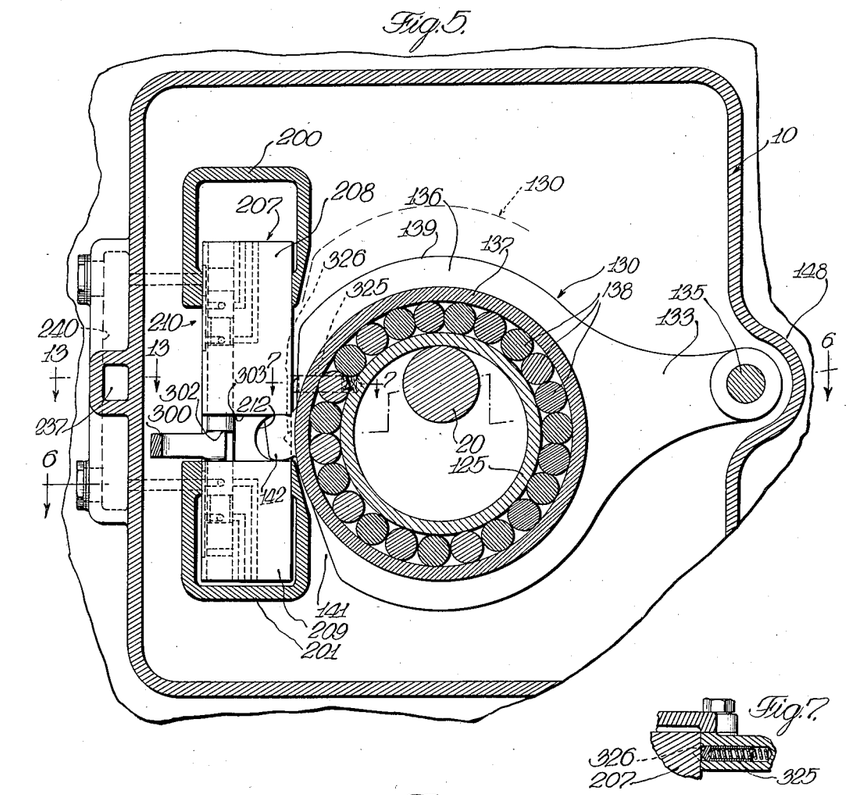
Figure 5 is a section taken approximately along the line 5—5 of Figure 1 and showing the adjustable eccentric mechanism for varying the displacement of the hydraulic pump.
Figure 7 is a fragmentary section taken along the line 7—7 of Figure 5.

The shiftable eccentric 130 is best shown in Figure 5. Referring to that figure, it will be seen that the eccentric 130 is in the form of a lever having a reduced end or arm 133 pivotally mounted in the casing 10 by means of a stud or pin 135 and an intermediate portion 136 which is enlarged and formed with a circular flange or boss 137 to receive bearings 138 in which the slotted plate 121 is journaled for rotation. The eccentric 130 is also provided with a reenforcing rib 139 which, at the end opposite the pivoted end 133, is interrupted, as at 141, and at this end the eccentric 130 is provided with a lug or ear 142 by which, through suitable mechanism later to be described in detail, the position of the eccentric 130 is controlled. The eccentric 130 is adapted to be moved by such mechanism from a position concentric with respect to the driving shaft 20, shown in dotted lines in Figure 5, to a position eccentric with respect to the driving shaft 20, shown in full lines in Figure 5, the eccentric member 130 swinging about its pivotal support 135 during this movement.

Figure 6:
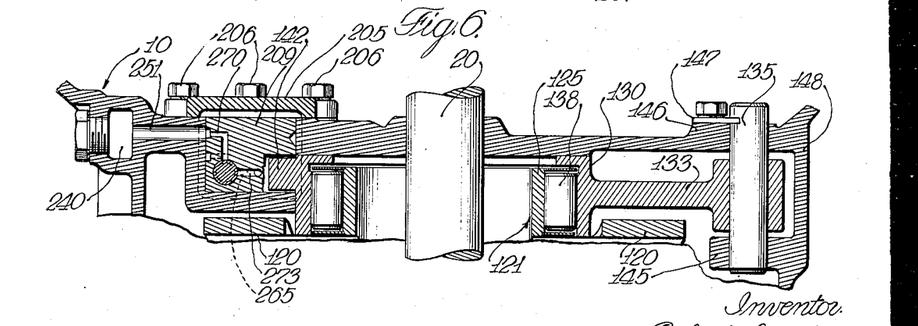
Figure 6 is a fragmentary section taken approximately along the line 6—6 of Figure 5.

Preferably, as best shown in Figure 6, the pivot pin 135 is in the form of a short shaft having one end carried by a lug 145 formed on the casing 10 while the other end is supported in a boss 146 and is suitably held therein by means of a key 147. Obviously, of course, other means may be provided for mounting the eccentric 130 for swinging movement into and out of concentric position with respect to the driving shaft 20. To accommodate the eccentric lever 130 the casing 10 is provided with a boss 148.

The cylinder casing 55 and the rotatable slotted plate are adapted to rotate together, by virtue of the engagement of the piston operating levers within the slots formed on said plate. When the latter is moved to a position of eccentricity with respect to the driving shaft 20, which forms the axis about which the cylinder casing 55 rotates, the rotatable slotted plate rotates about an axis which is spaced from the axis of the driving shaft 20. Thus, assuming that the cylinder casing and the rotatable slotted plate have been rotated to a position in which two of the slots are disposed vertically and two horizontally, the pistons of the upper and lower cylinders will be in an intermediate position, as shown in Figures 2 and 10, with their control arms or levers displaced vertically in the vertically disposed slots 120, while the other pair of pistons on either side of the vertical plane will be displaced downwardly in their cylinders, this being occasioned by the downward displacement of the eccentric with respect to the axis of the driving shaft 10, which downward movement carries with it the outer ends of the control arms, and hence causes the downward movement of the lateral pistons in their cylinders. If, for example, the eccentric 130 were moved upwardly, instead of downwardly, to a position of concentricity with respect to the driving shaft 20, the control arms 102 and 103 would be in an upper position and the lateral pistons 92 and 93 would be adjacent the upper ends of their cylinders 65 and 66, rather than in a lower position as viewed in Figures 2 and 10.

When the casing 55 and plate 121 are rotated, say through 90° in the direction of the arrow in Figure 2, the pistons 90 and 91 are next caused to be shifted from their intermediate position, shown in Figure 2, to a position adjacent the lower ends of their cylinders 56 and 57. Thus, rotation of the casing 55 carries with it the rotatable plate 121 which, if disposed eccentrically, causes opposite pairs of pistons to move within their cylinders. The hydraulic unit, thus described, forms the driving unit or the hydraulic pump by virtue of such relative movement of the pistons within their cylinders. The progressive operation of the pistons and the liquid thus pumped will be shown somewhat diagrammatically later.

The cylinder casing 55 is shown somewhat in detail in Figures 3 and 4. Referring to these figures, as well as to Figure 2, it will be observed that the upper and lower cylinders 56 and 57 are each provided with an open end 150 which is closed by a cap plate 151, see Figure 2, secured to the walls of the cylinder casing 55 by cap screws 152. The horizontally spaced cylinders, as viewed in Figures 2, 3, and 4, are also provided with an open end enclosed by cap plates 151 of identical or similar construction. Each of the four cylinders is also provided with an opening 156 to accommodate the forward end of associated piston operating arm or lever.

The four cylinders are arranged in oppositely disposed pairs, and the cylinders of each pair are connected at opposite ends by the port or channel means described above, whereby one end of one of the cylinders of a pair is connected with the corresponding end of the other cylinder of that pair. The same is true of the other ends of these cylinders as well as of the cylinders of the other pair. Preferably, the two pairs of cylinders are disposed at an angle of 90° with respect to the other pair of cylinders.

Thus, when the pistons 92 and 93, for example, are moved from the position shown in Figure 2 to the opposite ends of the associated cylinders, pressure is created in the port or channel 67 while suction is created in the other port or channel 68. The same is true of the pistons 90 and 91; that is, when these pistons are moved toward one end of associated cylinders, pressure is created in one of the channels 59 and 60 while suction is created in the other. By virtue of the 90° displacement of the two pairs of cylinders, it will be observed that the pressures developed in one of the lower channels and the suction developed in the opposite channel is initiated at substantially the point where the pressure and the suction developed in the other two channels is substantially half way completed. This assures an even steady operation. Obviously, of course, a greater or a lesser number of cylinders could be employed.

The rotation of the cylinder casing and the corresponding movement of the eccentric rotatable member 121 causes the continual reciprocation of the pistons within their cylinders with the consequent development of suction and pressure as outlined above and which will be explained in detail later. The pressure and suction are led out through the various ports 82, 83, 84 and 85, see Figure 11, to the manifold 80 which, as mentioned above, is preferably formed as a part of the intermediate wall 15. The manifold 80 is provided with pressure and suction chambers 160 and 161, one of said chambers being the pressure chamber while the other is a suction chamber in one position of the eccentric 130, these relations being reversed when the eccentric 130 is moved from one position of eccentricity on one side of the axis of the driving shaft 20 a position on the opposite side thereof.

Figure 11:
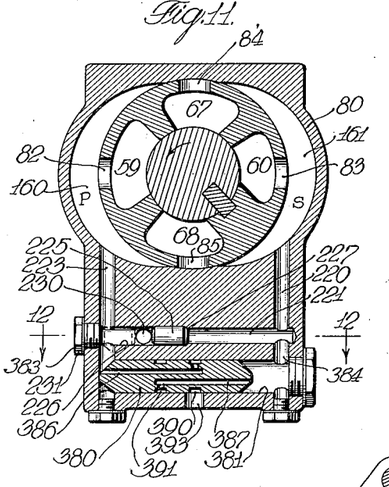
Figure 11 is a section taken approximately along the line 11—11 of Figure 1 and showing the pressure and suction leads associated, respectively, with the pressure and suction sides of the hydraulic driving unit.

As best shown in Fig. 11 in which the parts are arranged for the positions shown in Figures 3, 4, and 5, the channel 67 is just ready to move into communication, through port 84, with the chamber 160, this chamber being a pressure chamber when the eccentric 130 is disposed as shown in Figure 1. The channel 59, which connects cylinders 56 and 57, has been in communication with the pressure chamber 160 for one quarter of a revolution or 90° and the channel 68, which connects one end of the other pair of cylinders 65 and 66, has just moved out of communication with the pressure chamber 160 and is just ready to move into communication, through port 85, with the suction chamber 161. The channel 60, which connects the cylinders 56 and 57 at the ends opposite their connection to channel 59, has been in communication with the suction chamber 161 for one-quarter of a revolution or 90°.

Figure 15:
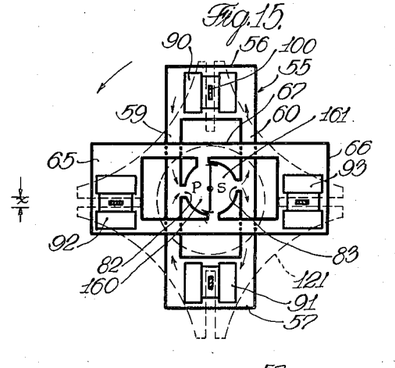
Figures 15 to 18, inclusive, are diagrams illustrating the operation of the hydraulic units.

This pumping operation of the hydraulic unit 50 is shown diagrammatically in Figures 15 to 18, and it will be noted that the slotted plate 121 is rotatable eccentrically with respect to the axis of rotation of the cylinder casing 55 but that the position of the pistons follow the slots 120 of the rotatable eccentric plate member 121. The differential between the pistons and slots caused by the levers 100 etc. have been disregarded in these figures. In these figures, Figure 15 shows the same relations which are illustrated in Figures 2 to 5, it being noted that the cylinder 56 is in an upper position and the cylinder 57 in a lower position while the cylinders 65 and 66 are disposed laterally. As will be clear in Figure 15, the axis of rotation of the slotted plate 121 is disposed a distance equal to $x$ below the axis of rotation of the cylinder casing 55. As is apparent, as long as the eccentric 130 is maintained in fixed position the distance $x$ remains constant. In this position, the upper and lower pistons 90 and 91 are in an intermediate position while the other pistons 92 and 93 are at one end, the lower end as viewed in Figure 15, of the cylinders 65 and 66.

Figure 16:
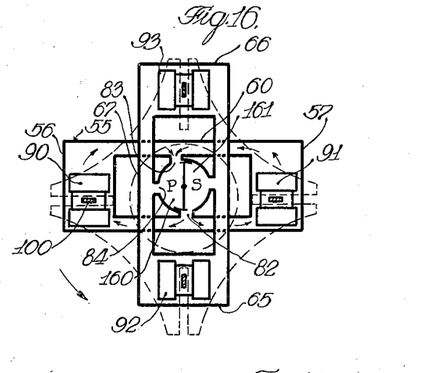
Figure 17:
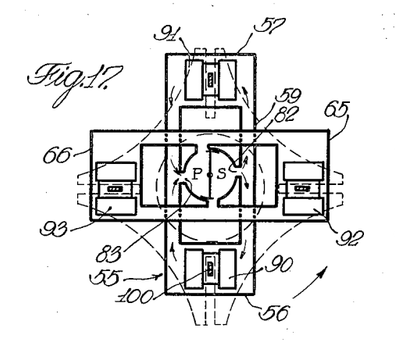
Figure 18:
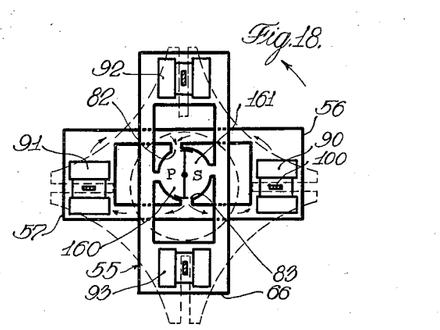

When the cylinder casing has been rotated in the direction of the arrow through an angle of 90°, the slotted plate 121 rotating with the cylinder casing, the pistons assume the position indicated in Figure 16 in which the pistons 90 and 91 have both been moved in the same direction relative to their cylinders and now occupy a position at the lower ends thereof, the direction of movement of the confined liquid being indicated by the small arrows, it being observed that the port 82 has been moved from a position in which it communicates with the pressure chamber 160 intermediate the ends thereof to a position where it has just ceased to communicate with the pressure chamber 160 and is ready to begin to communicate with the suction chamber 161. At this point, of course, the pistons 90 and 91 are ready to begin their movement toward the other end of the cylinders 56 and 57 in which the liquid moves from the cylinders 56 and 57 through the channel 60 and through the port 83, which has just moved into communication with the pressure chamber 160, to that chamber. In order to more clearly show the relations involved, the ports 82 and 83, as well as the other ports, are shown in Figures 15 to 18 as being displaced slightly in a counterclockwise direction.

At the next rotation of 90°, the pistons 90 and 91 have completed one half of a complete revolution, the port 82 now communicating with the intermediate portion of the suction chamber. At this time, the port 83, which directs the liquid into the pressure chamber 160, has been moved from the position just entering the pressure chamber, see Figure 16, to the intermediate position shown in Figure 17.

When the casing 55 has again been rotated through 90°, the pistons 90 and 91 are at the ends of their cylinders opposite the ends in which they were disposed in Figure 16. In this position the port 82 is just ready to begin to open into the pressure chamber 160 and the fluid is ready to begin to move in the direction of the arrows. In this position, also, the port 83 is just ready to open into communication with the suction chamber 161.

As the movement and operation of the other pistons 92 and 93 is exactly the same, a further discussion is unnecessary, the only difference being the 90° phase relation mentioned above. It will therefore be noted from the above that opposite pistons move in the same direction relative to the cylinders and that, as long as the eccentric 130 is on one side of the axis of the driving shaft 20, pressure always exists in one of the chambers 160 and 161 and suction in the other chamber.

The driven hydraulic unit is substantially identical, as mentioned above, with the driving unit and the operation is substantially the same. The pressure from the pressure chamber, which is chamber 160 in the positions shown in Figures 15 to 18, is communicated to the chamber in the driven unit which would correspond to the suction chamber indicated in Figures 15 to 18. For example, if pressure were introduced into the suction chamber shown in Figures 15 to 18, the casing 55 would be caused to rotate in the direction indicated by the arrows, which is the same direction in which it is rotated by power when serving as the driving unit. In view of the identity between the driving and driven units, further description of the driven unit is deemed unnecessary, the corresponding parts being indicated by the same reference numerals with the suffix $a$ added thereto. It is not to be understood, of course, that corresponding cylinders and pistons of the driving and driven units are always or necessarily opposite one another, even when they are driven at a one to one ratio, the construction being such, as best shown in Figure 3, that the pressure from the pressure chamber 160, in case that is the pressure chamber, is communicated to the pressure chamber 160a which serves to drive the driven unit in exactly the same manner as the driving unit would be driven if pressure were introduced into the suction chamber 161 and the eccentric shifted to a diametrically opposite position. However, the position of the driven casing 55a is, of course, independent of the position of the driving casing 55. Any form of communication between the chambers 160 and 160a may be utilized, as desired. For example, a single opening would be sufficient so long as the opening is large enough to prevent excessive frictional losses due to the movement of the liquid through such opening.

The extent of displacement of liquid for every revolution of the driving unit will depend, of course, upon the amount of eccentricity, or, in other words, upon the distance $x$, see Figure 15. If the distance $x$ is equal to zero, that is, when the slotted plate 121 rotates about an axis concentric with respect to the axis of rotation of the cylinder casing 55, there will be no movement of the pistons 90, 91, 92 and 93 in their cylinders, and there will, therefore, be no liquid pumped. As soon, however, as the slotted plate 121 is shifted to an eccentric position, pumping action will begin, the quantity of liquid pumped being dependent, of course, upon the amount of eccentricity. The present invention contemplates improved means for shifting the slotted plate to a position of eccentricity with respect to the axis of the driving shaft 20, and preferably this movement is accomplished by power means having servo-motor characteristics. This is an important feature, because it will at once be recognized that the means maintaining the slotted plate 121 in its position of eccentricity is the means which takes the entire reaction involved in forcing the liquid into the pressure chamber. As mentioned above, the present invention contemplates utilizing the pressure of the pumped liquid itself as a means from which power or force is derived in sustaining the reactions imposed upon the slotted plate 121.

Figure 8:
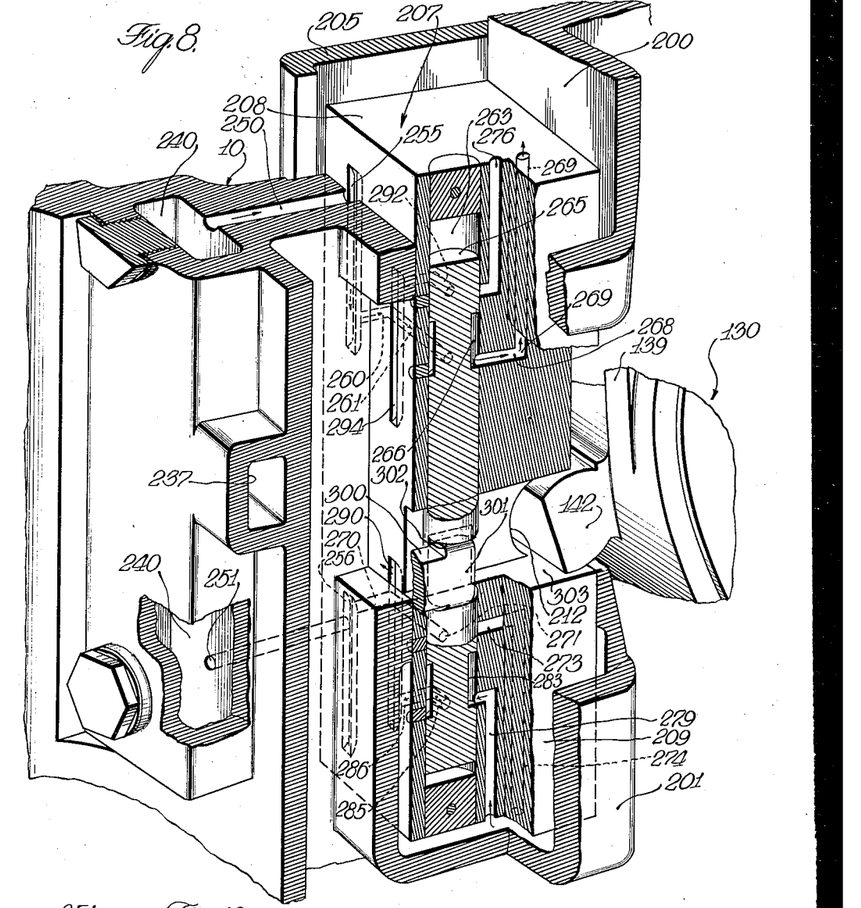
Figure 8 is an enlarged fragmentary perspective, illustrating the movable piston means for adjusting the eccentric of the hydraulic pump.

Referring now more particularly to Figures 5 to 8, inclusive and remembering that the slotted plate 121 is mounted for rotation upon bearings 138 in the eccentric 130, the amount of eccentricity of which may be varied by swinging the eccentric member 130 about its pivot axis 135, the front wall of the casing 10 is formed with chambers 200 and 201 open at their adjacent portions and at their front sides and of substantially square cross section, as best shown in Figure 8. The front ends of these chambers, which are actually cylinders, are closed by a closure plate 205 secured in any manner to the front wall of the casing 10, as by cap screws 206 or the equivalent. Mounted within the cylinders 200 and 201 is a double-ended piston 207 having upper and lower end portions 208 and 209 and fitted for substantially liquid-tight movement in the upper and lower cylinders 200 and 201. The lower part of the upper cylinder 200 and the upper part of the lower cylinder 201 are turned inwardly and interrupted to form an open space 210 between the cylinders 200 and 201. In this space the lug or ear 142 of the eccentric member 130 is adapted to move, and the intermediate portion of the piston 207 is provided with an arcuate slot 212 to receive the lug 142. As will be apparent, vertical movement of the piston within the cylinders 200 and 201 is adapted to shift the eccentric 130 from a concentric position with respect to the driving shaft 20 to a position of eccentricity, either upwardly or downwardly, with respect thereto.

According to the principles of the present invention, the eccentric 130 is adapted to be adjusted by pressure derived from the discharge side of the hydraulic pump or driving unit. As will be apparent from Figure 5, if fluid under pressure is admitted underneath the lower piston portion 209, for example, in which case the upper cylinder 200 may be either vented to atmosphere or may be connected with the suction side of the pumping unit, the pressures developed in the pump will be operative to raise the piston 207 and with it the eccentric member 130 will also be raised. Viewed in another way, if fluid under pressure be admitted into the upper cylinder 200, the piston 207 will be held down in the position shown in Figure 5 and with it will be held the eccentric member 130, the position shown in Figure 5 being the maximum lowered position in which the greatest volume of liquid per revolution will be pumped, or if liquid be prevented from flowing out of either cylinder the eccentric 130 and the piston 207 will be positively locked in any position of adjustment. Moreover, if the pressure maintained within either cylinder be relieved, the position of the eccentric member 130 will be changed accordingly.

Pressure from the pumping or driving unit is communicated from the driving unit to the cylinders 200 and 201 by passageways or channels which will now be described. Referring to Figure 11, it will be observed that a small conduit or bore 220 is formed in the manifold 80 carried by the intermediate wall 15 and that the bore 220 leads from the chamber 161 to a transverse bore 221, the other end of which communicates with the chamber 160 through a bore or conduit 223. The channel 221 is, therefore, in communication with both the pressure and suction chambers, regardless as to which chamber may be the pressure chamber and which the suction chamber.

This communication is controlled, however, by automatic valve means which, in the present construction, is operative to automatically retain one portion of the channel 221 in communication with the pressure side only of the driving unit, the chamber 160 being the pressure chamber when the parts are disposed as described above.

In order to maintain one portion of the channel 221 in constant communication with the pressure side of the driving unit, a plunger 225 is mounted within an enlarged portion 226 of the channel 221, and the plunger 225 is adapted in one position to move against a small shoulder 227 so as to close off communication between a lateral bore 230 and the chamber 161, thereby at the same time opening communication between the lateral bore 230 and the chamber 160 through the bore 223. A plug 231 serves to close one end of the channel 221 after the same has been drilled in the manifold 80, and one end of the plug 231 is adapted to serve as a stop for the plunger 225 when the latter is moved to the opposite position. This plunger serves as a shiftable valve for placing the lateral bore 230 into communication with that one of the chambers 160 and 161 which forms the pressure chamber of the driving unit.

For example, as shown in full lines in Figure 11, the pressure within the chamber 160 has forced the plunger 225 against the seat 227 so that the pressure is transmitted from the chamber 160 through the lateral bore 230 and is prevented from being dissipated through the channel 221 and the bore 220. Should the other chamber 161, for example, be subjected to pressure and the chamber 160 be subjected to suction, the small plunger 225 will immediately be shifted to the position shown in dotted lines in Figure 11 and will close off communication between the lateral bore 230 and the bore or conduit 223 and will open communication between the lateral bore 230 and the chamber 161 through the other conduit 220. In this manner, the lateral bore 230 is subjected at all times to pressure from the pressure side of the driving unit, irrespective of the position of the eccentric 130.

Figure 12:
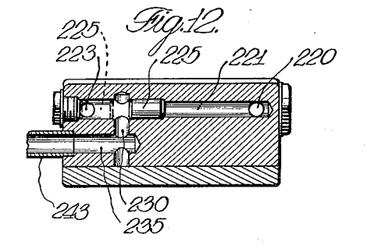
Figure 12 is a section taken approximately along the line 12—12 of Figure 11.
Figure 13:
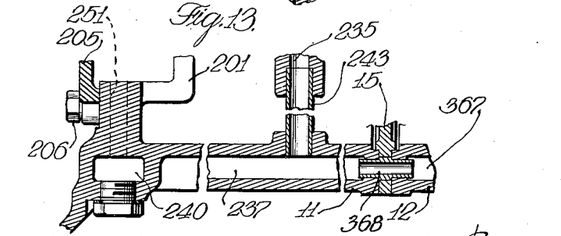
Figure 13 is a section taken partly along the line 13—13 of Figure 5 and illustrates the pressure leads for the pump and motor eccentric adjusting means.

A conduit or channel 235 communicates with the lateral bore 230, see Figures 1 and 12, and is connected by a suitable channel 237 formed in the side wall of the casing 10 with a vertically disposed auxiliary pressure chamber or pressure well 240, best shown in Figures 5 and 8, formed adjacent the forward end of the transmission casing. Preferably, these openings are cored when the casing 10 is formed, the communication between the channel 237 and the bore 235 in the intermediate wall 15 being established by a sleeve or thimble 243, best shown in Figure 13.

Pressure from the auxiliary presure well 240 is directed to the upper and lower portions, respectively, of the upper and lower cylinders 200 and 201 by manually controlled valve means. Referring now more particularly to Figure 8, the forward wall of the transmission casing 10 in which the pressure well 240 is formed is also provided with two lateral bores 250 and 251, the former being disposed in the casing wall adjacent the upper cylinder 200 while the lower bore 251 is disposed adjacent the lower cylinder 201. Both of these bores lead into communication with their associated cylinders.

In the side faces of the piston sections 208 and 209 vertical grooves 255 and 256 are formed, these grooves being adapted to be in communication, respectively, with the bores 250 and 251 at all times. Conduits 260 and 261 lead from the lower portion of the groove 255 to a relatively large vertical bore 263 formed in the piston 207 and in which is disposed a manually controlled valve plunger 265 having an annular groove 266 forming an interior space in the bore 263 with which the bore 261 communicates in one position of the valve 265, namely, that shown in Figure 8. In the plane of the bores 260 and 261 the piston 207 is provided with a second laterally directed bore 268, and this bore, in turn, communicates with a vertical bore 269 which leads to the upper end of the piston 208. The piston 209 is provided with a similar construction, small bores 270 and 271 leading from the groove 256 into the lower portion of the vertical bore 263, and in the plane of these small bores the piston is provided with an additional bore 273, the latter leading into communication through a vertical bore 274 with the space within the cylinder 201 underneath the piston section 209.

Referring again to the upper piston section 208, the piston 207 is provided with a vertical bore 276 which has a lateral leading into the vertical bore 263. Likewise the lower piston section 209 is provided with a bore 279 leading from the space below the lower piston section 209 into the vertical bore 263 in which the valve plunger 265 is mounted. In the position shown in Figure 8, the lower end of the valve plunger 265 is provided with an annular groove 283 with which the bore 279 communicates.

The length of the valve plunger 265, the disposition of the annular grooves 266 and 283, and the position of the bores 268 and 276, and 273 and 279, are such that in the lower position of the valve 265, relative to the piston 207, communication is established between the bore 269 and the pressure conduit 250 through the vertical groove 255, the bores 260 and 261, and the annular groove 266. At the lower end of the piston 207, the communication between the bore 274 and the pressure conduit 251 is shut off by virtue of the valve plunger 265 closing the communication between the lateral bore 273 and the bore 271 in the lower piston section 209.

At the lower end of the piston 207, the bore 279 communicates with the annular groove 283, and this groove communicates through bores 285 and 286 with a vertical groove 290 formed in one face of the piston 207 and extending to a point above the edge of the cylinder 201. In this way, when the valve plunger 265 is positioned as in Figure 8, the space under the lower piston 209 is vented to atmosphere, or at least is vented to the interior of the transmission casing 10. Any liquid below the lower piston 209 therefore escapes through the groove 290 over the edge of the cylinder 201 while liquid under pressure within the pressure well 240 is directed into the cylinder 200 through the bores 260, 261, 268 and 269. In this way, the pressure of the pumped liquid is utilized in shifting the eccentric member 130 and in holding the same in a position of eccentricity. In the upper piston section 208, a lateral bore 292 is disposed in the same plane as the lower end of the bore 276 and is in communication with an upper escape groove 294. If desired, the bores 269 and 276 may be merged into one bore, and the same is true of the bores 274 and 279. If desired, of course, the escape grooves 290 and 294 may be arranged to be closed by a wall or the like and suitable bores provided to accommodate the liquid discharged from the cylinders 200 and 201.

The valve plunger 265 is adapted to be moved to an upper position in which the groove 283 in the lower piston section 209 opens communication between the bore 271 and the bores 273 and 274, and in this position liquid from the pressure well 240 is caused to flow through the bore 251, into the groove 256, through the bores 270 and 271, and from thence through the bores 273 and 274 to the underside of the lower piston 209. At the same time, the space above the upper end of the upper piston 208 is vented by opening communication between the lower end of the bore 276 and the lateral bore 292 which leads into the vertical escape groove 294 by which liquid above the piston 208 escapes to the bottom of the transmission casing 10. Therefore, when the valve 265 is in its upper position, liquid under pressure is directed into the lower cylinder 201 and forces the piston 207 upwardly, the liquid displaced by such movement escaping through the ports 292 and 294.

In order to hold the piston 207 in any position of adjustment, the dimensions of the grooves 266 and 283 are such that the plunger 265 can be moved to a position intermediate the associated ports so as to close off communication between the pressure well 240 and both cylinders 200 and 201 and, at the same time, closing off communication between the outlet bores 276 and 279 and the vent grooves 290 and 294. In this manner, the eccentric member 130 may, to all effects, be positively locked in any position of eccentricity.

Figure 14:
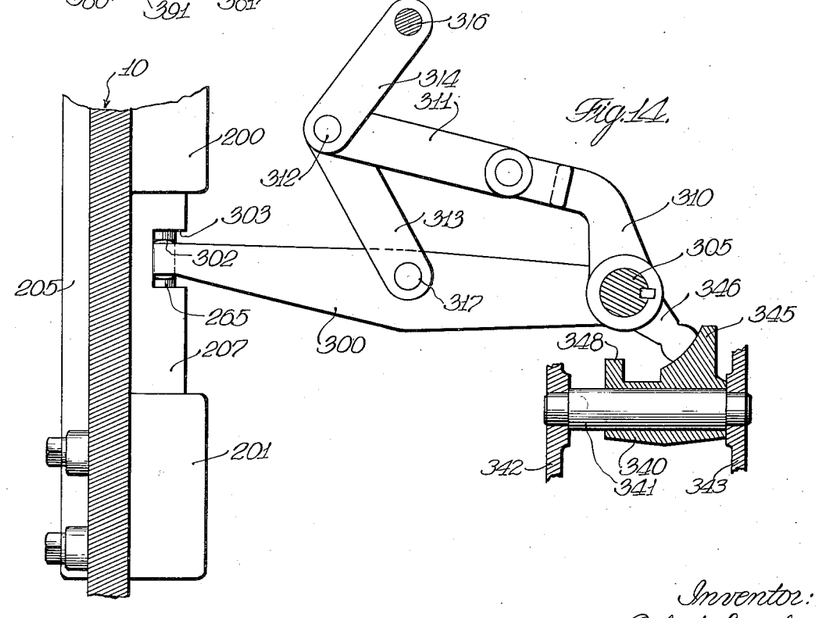
Figure 14 is a more or less diagrammatic view of the manually operated control linkage for governing the position of the eccentric shifting piston shown in Figure 8, the linkage being shown in the neutral position.

The plunger valve 265 is arranged to be manually controlled. It is to be observed that this valve is shiftable within the piston 207 and that the piston 207 is itself shiftable within the cylinders 200 and 201 and relative to the transmission casing 10. For shifting the valve 265 a control lever 300 is pivotally mounted within the casing 10, preferably on or adjacent the casing wall in which the pressure well 240 and the pressure lead 237 is formed, although this is not essential. The control lever 300 terminates in an operating finger 301 arranged to be disposed within a slot 302 formed in one side of the plunger valve 265 and within a slot 303 formed in the intermediate portion of the piston 207. As best shown in Figure 14, the operating arm 300 is pivotally mounted on a short shaft or pin 305 which is itself journaled for movement in the casing 10 in any desired manner. Keyed to the shaft 305 and within the casing 10 is a short lever 310 having its upper end pivotally connected with a link 311. The link 311 is pivotally connected with the pivot pin 312 that connects a pair of toggle links 313 and 314, the toggle link 314 being anchored at its upper end to a pivot pin 316 supported in fixed position relative to the casing 10 in a boss or the like. The lower end of the lower toggle link 313 is pivotally connected, by a pivot stud 317, with the control lever 300.

A hand or foot operated member (not shown) is connected with the shaft 305 outside the housing 10 and is operative to rock the shaft to swing the toggle operating arm 310 forwardly and rearwardly in the casing 10, this movement raising or lowering the operating lever 300.

As best shown in Figure 5, a spring pressed detent plunger 325 is mounted in the forward wall of the casing 10 and is adapted to enter a small recess 326 formed in the piston 207, and the spring pressed plunger 325 is so located relative to the piston 207 that the latter is positively and mechanically returned to its neutral position whenever it nearly reaches that point. This avoids any delay in returning or moving the eccentric 130 to a position of concentricity with respect to the driving shaft, which might otherwise occur because of the very small amount of liquid pumped when the eccentric member 130 closely approaches its concentric position.

In the position shown in Figure 14, it will be observed that the piston 207 is in a position adjacent the upper end of the upper cylinder 200, a position in which the eccentric member 130 has been moved to a position of concentricity with respect to the axis of the driving shaft 20. Since this is the position in which the driving unit pumps no liquid at all, it is termed a neutral position in that no power is transmitted by the transmission when so adjusted.

From Figures 5, 8 and 14, it will be observed that the slot 303 in the piston 207 is wider than the thickness of the operating finger 301 and that the valve plunger 265 may be moved a given distance relative to the piston 207 before contacting with and manually moving the latter. If the eccentric member 130 is in a position of concentricity, this movement of the plunger valve 265, that is, between the limits of the width of the slot 303, will not effect any readjustment of the position of the eccentric 130, because at the moment no liquid is being pumped. That is to say, if the piston 207 is in a position which brings the eccentric member 130 to a position of concentricity, a downward movement, for example, of the plunger valve 265 relative to the piston 207 to the position relative to the piston 207 shown in Figure 8, whereby the pressure well is in communication with the upper cylinder 200 above the upper piston section 208, will not effect any movement of the piston 207 because, since the eccentric member 130 is in a position of concentricity, no pressure is developed by the driving unit and hence no pressure exists within the pressure well 240. However, when the operating lever 300 is given a slight additional movement downwardly, thus manually shifting the eccentric 130 from its concentric position, pumping action begins immediately, with the consequent development of pressure within the pressure well 240. The pressures developed at this point are rather high because, there being only a slight amount of eccentricity, a small amount of liquid is pumped per revolution and hence the liquid is at a relatively high pressure. As soon, of course, as this pressure is developed it is transmitted through the various conduits and leads into the pressure well 240 and from thence through the bore 250, groove 255, bores 260 and 261, groove 266 and bores 268 and 269 to the top of the upper piston 208. The pressure thus developed moves the piston 207 downwardly without any further movement of the control 300, and this downward movement continues until the piston 207 moves downwardly relative to the plunger valve 265 until the communication between the pressure well 240 and the upper end of the cylinder 200 is closed off. The downward movement of the piston 207 to this extent, determines the eccentricity of the member 130.

It will at once be apparent that the piston parts may be so designed as to afford any predetermined maximum speed reducing ratio of driving to driven parts, because when the eccentric 130 is in neutral or concentric position it is necessary to shift the plunger valve 265 a predetermined amount before the piston 207 is engaged and actually shifted from its neutral position, for, as explained above, in starting from neutral, no pumping action takes place, regardless of the position of the plunger valve 265, until the piston 207 is actually moved a slight amount, and once this slight movement has occurred pumping action of course begins at once. This immediately shifts the piston 207 a given amount, the amount of shift being determined by the amount of movement necessary for the piston to move relative to the plunger 265 to bring the piston and the plunger 265 back to a position in which all the ports in the piston 207 are closed off, it being understood that during this time the operating member 300 is given no additional movement and remains in fixed position relative to the casing 10. By thus holding the operating lever 300 in fixed position the eccentricity of the member 130 is determined, and this, in turn determines the maximum speed reducing ratio of driving to driven parts established by the transmission. By making the permissive movement of the control finger 301 in the slot 303 relatively short before the finger contacts with the plunger to manually move the same, a relatively high maximum ratio is provided for, while if this relative movement is a substantial amount before the finger contacts with the plunger 207 to manually move the same, the maximum speed reducing ratio capable of being established by the transmission is relatively low. This is an important feature in that it allows the designer to select any low ratio required to thereby prevent the driving unit from creating excessive pressures within itself which might cause it to fail by such excessive forces.

As will be obvious, the operating member 300 may be moved to any position within its range and the piston 207 automatically follows the finger 301 and the plunger valve 265, thus shifting the eccentric member 130 by the power of the pumped liquid.

Figure 19:
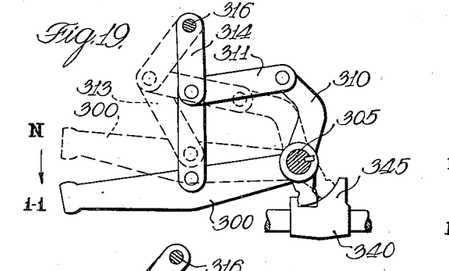
Figures 19, 20 and 21 show the different operating positions for the control linkage of Figure 14 and the relation between these positions and the neutral position of the linkage.
Figure 20:
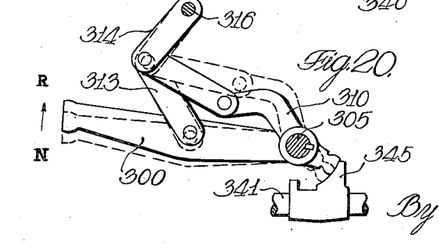
Figure 21:
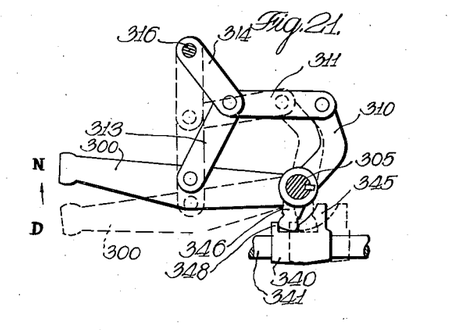

The various positions of the control lever 300 are indicated in Figures 19, 20 and 21. In Figure 19 the neutral position is indicated in dotted lines while, in full lines, the operating lever 300 has been indicated in the position it assumes when the driving and driven hydraulic units rotate at substantially a one to one ratio. In Figure 20 the movement of the lever from its neutral position to its reverse position is indicated. It will be noted that this movement of the lever 300 is the reverse of that indicated in Figure 19.

As best shown in Figure 19, the operating member 300 moves downwardly from its neutral position to effect a forward drive, the downward movement of the operating lever 300 corresponding to a downward movement of the piston 207. The operating lever 300 is adapted to be moved to and to remain in any position intermediate these two points, the only limitation being that in its first movement from neutral position, the maximum reduction possible in established by virtue of the initial movement of the operating lever 300 required to shift the valve plunger 265 a given amount before the piston 207 can itself be shifted out of neutral position by a slight further movement of the operating arm 300.

In shifting the operating arm or lever 300 from neutral to a one to one drive, the arm 310 is moved from its dotted line position in Figure 19 to the position shown in full lines which is in a clockwise direction. This movement is occasioned by any known means which may be arranged to rotate the shaft 305.

Referring now to Figure 20, it will be observed that when the shaft 305 is given a counterclockwise movement to move the arm 310 from its neutral position to its reverse position, the toggle links 313 and 314 are moved to a relative position of greater angularity which raises the operating lever 300. This causes the eccentric member 130 to be raised beyond its concentric position and on the other side of the axis of the driving shaft 20 from that shown in Figure 5 which illustrates the position of the eccentric 130 when a one to one forward drive is effected between the hydraulic driving and driven units.

Reference has been made above to the feature of mechanically connecting the driving and driven shafts 20 and 21 when the hydraulic units have been arranged to transmit the drive at a one to one ratio. With this end in view, the shiftable clutch member 30 having the grooved collar 35 is provided and is adapted to mechanically clutch the driving and driven shafts 20 and 21 together. The shiftable clutch member 30 is controlled by means of a shift fork 340 slidably mounted on a relatively fixed shift rod 341 carried in any desired manner by lugs 342 and 343 (Figure 14) preferably formed integral with the side wall of the casing 10. The shift fork 340 includes a forked portion having arms 340a and 340b (Figure 1) engaged within the groove 35, as best shown in Figure 1, and this portion may, if desired, be disposed within a suitably formed slot or the like formed in one side of the manifold 80. Obviously, of course, any other means for connecting the shiftable member 30 with the shift fork 340 may be employed if desired.

It is desirable to prevent the shiftable clutch member 30 from moving into engagement with the driving shaft 20 as long as the driving ratio between the hydraulic driving and driven units has not reached a ratio of one to one. For this purpose, the shift fork 340 is provided with an arcuate section 345 and the operating arm 310 carries a lower section 346 which, in all positions of adjustment from a neutral and from a reverse position to a position of a one to one ratio holds within or along the arcuate section 345 of the shift fork 340. However, when the shaft 305 has been rocked to bring the arm 310 and the lever 300 from their dotted line or neutral position to their full line or one to one forward position shown in Figure 19, the shaft 305 may then be given an additional movement in a clockwise direction as viewed in Figures 19 and 21, to bring the linkage from the dotted line position in Figure 21 to the full line position. This additional movement causes the lower arm 346 to engage a lug 348 formed on the shift fork 340 opposite the arcuate section 345. When, therefore, the arm 310 is given an additional clockwise movement from the full line position shown in Figure 19, the shiftable clutch member 30 is caused to quickly engage the teeth 32 formed on the driving shaft 20. At this time the hydraulic driving and driven units will be rotated together, and the movement of the arm 310 from the position shown in full lines in Figure 19 to the position shown in full lines in Figure 21 causes the arm 300 to return the piston 207 to a neutral position. During this transition, any liquid pumped while the eccentric 130 is being returned to concentric position serves only to hasten the return of the piston 207 to neutral. Thus, the momentary continuance of the pumping action, occurring by virtue of the eccentric positioning of the member 130, rapidly diminishes to zero.

The shiftable eccentric 130a for the hydraulic driven unit is arranged to be automatically controlled and to be automatically shifted from a position of concentricity to a position of maximum eccentricity by virtue of the pressures developed in the driving unit. For this purpose, the eccentric member 130a of the hydraulic driven unit, which is mounted in substantially the same manner as shown in Figure 5 for the hydraulic driving unit, is provided with a spring 360 or the equivalent which biases the eccentric 130a for movement toward a concentric position, this position being determined by a boss 361 with which the reenforcing flange 139a on the eccentric member 130a is adapted to contact. For automatically moving the hydraulic motor eccentric 130a to a position of eccentricity, a plunger 365 is provided. This plunger engages the eccentric member 130a and is movably mounted within a bore 366 which forms a cylinder for the plunger 365. The bore 366 is in communication with a lateral channel 367, see Figure 13, which communicates through sleeve 368 joining the casing sections 11 and 12 with the passageways 235 and 237. Any pressures developed by the operation of the hydraulic driving unit is therefore immediately transmitted to the plunger 365 which forces the eccentric member 130a up against the upper lug or boss 369 against the tension of the spring 360 and holds the eccentric member in that position as long as any pressure is developed within the hydraulic driving unit. Of course, as soon as the pressure is reduced to zero or substantially zero, the spring 360 is operative to return the eccentric 130a to its neutral or position of concentricity. In this way the hydraulic motor is automatically controlled by the hydraulic pump in such a manner that the establishment of driving pressures by the pump unit immediately is effective to shift the motor eccentric to driving position before any torque is transmitted.

In devices of this sort wherein some of the liquid from the pressure side of the hydraulic pump or driving unit is diverted to a servo-motor apparatus for adjusting the position of the eccentric 130 and where such diverted liquid is vented to the bottom of the transmission casing, for example, it is desirable to provide some form of automatic operating means for withdrawing the liquid so diverted and directing the same back into the operating system again. This also is desirable so as to provide for any leakage which may occur and which might otherwise render the system inoperative because of the loss of liquid.

With this purpose in view, the present invention contemplates the provision of a shiftable suction valve 380, best shown in Figure 11 and quite similar in many respects to the plunger valve 225, especially in view of the fact that the suction valve 380 is movable from one position to the other as is the valve 225, dependent upon which of the chambers 160 and 161 is the suction chamber and which is the pressure chamber. The valve 380 is movably mounted within a relatively large bore 381 formed in the lower portion of the manifold 80 formed in the intermediate housing 15, and vertical bores 383 and 384 are provided and which serve to place opposite ends of the transverse bore 381 in communication with the chambers 160 and 161 respectively.

The valve 380 is provided with two longitudinal bores 386 and 387 communicating, respectively, with annular grooves 390 and 391 formed in the body of the valve plunger 380. A relatively small opening 393 opens communication between the transverse bore 381 and a sump chamber 395 carried by the intermediate wall 15. The small opening 393 is so disposed that, in one position of the valve 380, the annular groove 390 communicates therewith, while in the other position of the valve 380 the other groove 391 communicates therewith. Thus, whichever one of the chambers 160 and 161 is subjected to suction, the valve 381 will be automatically shifted to place the opening 393 in communication with that chamber while the communication between the opening 393 and the chamber serving as the pressure chamber will be automatically cut off. Thus, any liquid in the bottom of the transmission casing 10 will be automatically drawn into the system again by virtue of the suction constantly applied through the valve means just described.

While I have described above the preferred construction in which the principles of the present invention have been illustrated, it is to be understood that the present invention contemplates various departures therefrom within the scope of the appended claims.

It is also to be understood that while I have referred to a one to one ratio between the hydraulic driving and driven units, it is to be understood that this ratio may be slightly increased to accommodate leakage and the like.

Thus, it is to be understood that my invention is not to be limited to the specific details shown and described but that, in fact, widely different means may be employed in the broader aspects of my invention.

What I claim, therefore, and desire to secure by Letters Patent is:

1. In hydraulic transmission apparatus and the like, a transmission casing, driving and driven shafts journaled therein, a hydraulic pump connected to be driven by said driving shaft, a hydraulic motor connected to drive said driven shaft, conduit means connected to said pump and motor, means cooperating with said pump for varying the displacement per revolution thereof, means for actuating said displacement varying means, means operable only after said last named means has been positioned to secure equal displacement of the pump and motor for mechanically connecting said driving and driven shafts, and means operable simultaneously therewith for shifting said actuating means into a zero displacement.

2. In hydraulic transmission apparatus and the like, a transmission casing, driving and driven shafts journaled therein, a hydraulic pump connected to be driven by said driving shaft, a hydraulic motor connected to drive said driven shaft, conduit means connected to said pump and motor, means cooperating with said pump for varying the displacement per revolution thereof, means deriving power from said pump for actuating said last named means, mechanical means directly connecting said driving and driven shafts, and means for effecting a mechanical connection between said driving and driven shafts after said hydraulic pump has been adjusted to provide a substantially one to one ratio between said shafts and simultaneously returning the pump displacement varying means to zero.

3. In hydraulic transmission apparatus and the like, a transmission casing, driving and driven shafts journaled therein, a hydraulic pump connected with said driving shaft and comprising a plurality of cylinders rotatable therewith and pistons disposed within said cylinders, a hydraulic motor connected with said driven shaft and also comprising a plurality of cylinders rotatable with the driven shaft and pistons disposed within said cylinders, means adapted to be disposed eccentrically with respect to the axis of said driving shaft and connected with said pump pistons whereby rotation of said cylinders about the axis of said driving shaft causes a movement of the pistons within the cylinders of the pump, means adapted to be disposed eccentrically with respect to the axis of the driven shaft and connected with the pistons of said hydraulic motor, commutating means connecting the cylinders of the hydraulic pump with the cylinders of the hydraulic motor whereby when said eccentric means is fixed in position the pressure developed by said pump is effective to drive said motor, an adjusting cylinder, a pressure line leading from the pressure side of said pump to said last named cylinder, a piston disposed therein and connected with the eccentric means of said pump, a pressure line leading from the pressure side of said pump to said last named cylinder, valve means carried by and movable with said last named piston and operative to control the diversion of pressure from the pump into said last named cylinder, means for shifting said valve means with respect to said last named piston for directing pressure and to said auxiliary cylinder to shift the eccentric means of said pump to vary the displacement per revolution of the latter, a piston and cylinder associated with the eccentric means for the hydraulic motor, spring means associated with said last named eccentric means for returning the latter to concentric position, and a pressure line communicating with the pressure side of said pump and with said last named cylinder and piston, whereby pressure developed by the operation of said hydraulic pump automatically disposes the eccentric means for the hydraulic motor in a position eccentric with respect to the axis of said driven shaft.

4. In hydraulic transmission apparatus and the like, a transmission casing, driving and driven shafts journaled therein, a hydraulic pump connected with said driving shaft, a hydraulic motor connected with said driven shaft, said motor and pump each including a cylinder rotatable with the associated shaft and a piston movable within said cylinder, a relatively stationary piston actuating member adapted to be disposed eccentrically with respect to the axis of the associated shaft, there being one of said members for each of said motor and said pump and each of said members being operatively associated with the corresponding piston for causing movement thereof in its cylinder, each of said eccentric members being movable from a position of eccentricity with respect to the associated shaft to a position of concentricity, means actuated by the pressure developed by said pump for controlling the position of the eccentric member of said hydraulic pump and the eccentric member of said motor to vary the displacement of each, one being arranged for both forward and reverse, and means for controlling the application of pump pressure to said controlling means including a manually shiftable member, and means associated therewith whereby movement of the shiftable member in one direction from a neutral position arranges said one eccentric for reverse and movement of the shiftable member in the other direction first arranges the displacements for a one to one ratio, a continued movement of said shiftable member in the same direction returning both of said eccentric members to positions of zero eccentricity at an increased rate, a direct acting clutch adapted to connect said shafts to rotate together, and means to effect engagement of said clutch operated by said continued movement of the shiftable member past the position in which the pump drives said motor at a one to one ratio.

5. In hydraulic transmission apparatus and the like, a transmission casing, driving and driven shafts journaled therein, a hydraulic pump connected with said driving shaft, a hydraulic motor connected with said driven shaft, said motor and pump each including a cylinder rotatable with the associated shaft and a piston movable within said cylinder, a relatively stationary piston actuating member adapted to be disposed eccentrically with respect to the axis of the associated shaft, there being one of said members for each of said motor and said pump and each of said members being operatively associated with the corresponding piston for causing movement thereof in its cylinder, each of said eccentric members being movable from a position of eccentricity with respect to the associated shaft to a position of concentricity, means for controlling the position of the eccentric member of said hydraulic pump to vary the displacement thereof, said means including a shiftable member, a direct acting clutch adapted to connect said shafts to rotate together, means to effect engagement of said clutch operated by continued movement of said shiftable member past the position in which said pump drives said motor at a one to one ratio, and means operative substantially simultaneously with the engagement of said direct acting clutch for returning both of said eccentric members to positions of zero concentricity.

ROBERT LAPSLEY.